UNITED STATES PATENT OFFICE.

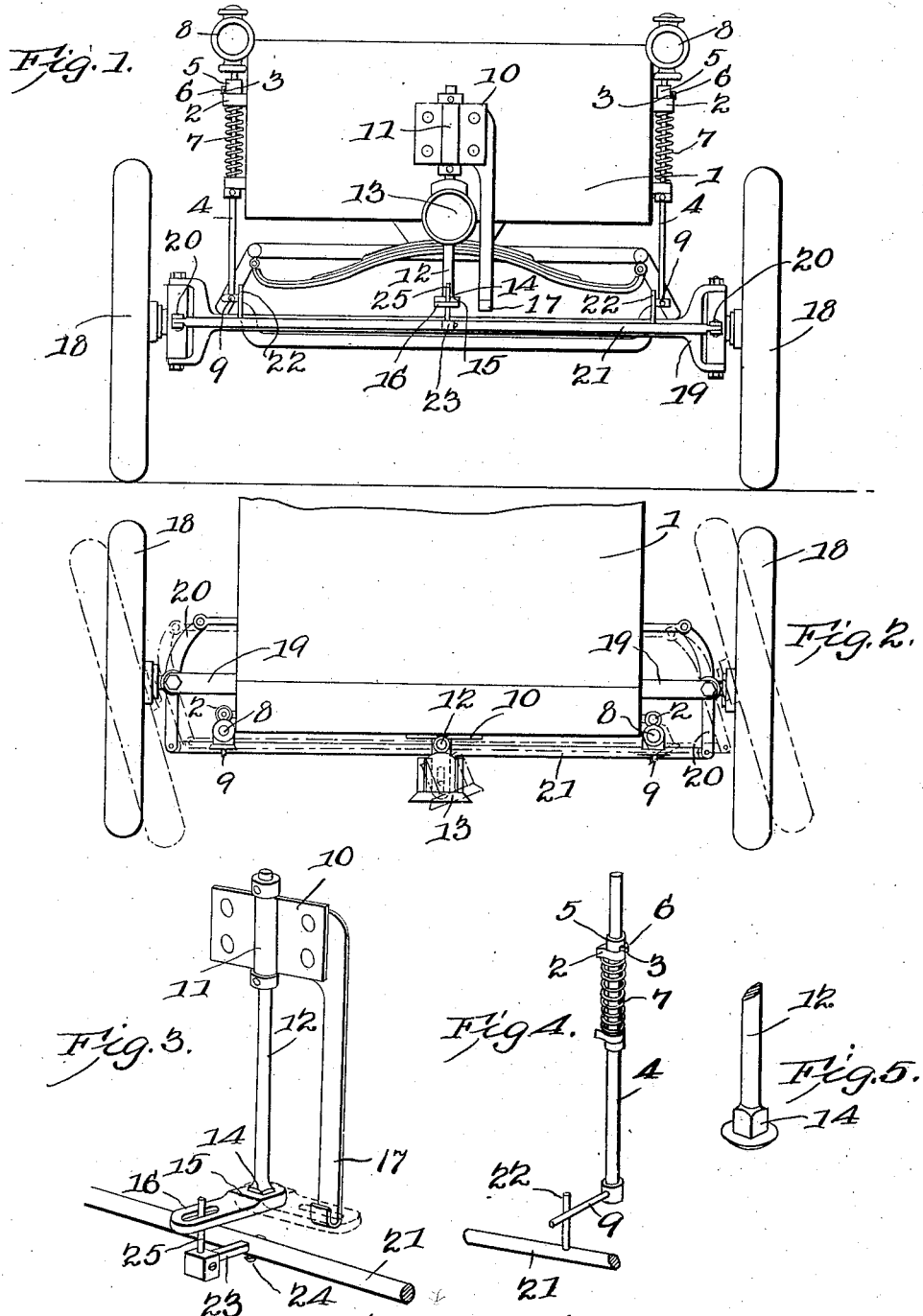

CASSIUS M. SPINK, OF WARREN, INDIANA.

AUTOMOBILE-HEADLIGHT.

No. 842,818.            Specification of Letters Patent.          Patented Jan. 29, 1907.

Application filed May 14, 1906. Serial No. 316,797.

*To all whom it may concern:*

Be it known that I, CASSIUS M. SPINK, a citizen of the United States, residing at Warren, in the county of Huntington and State of Indiana, have invented a new and useful Automobile-Headlight, of which the following is a specification.

This invention relates to headlight-supports for automobiles, and its object is to provide novel means whereby the lights upon the front of an automobile will be turned while the machine is rounding a corner and will automatically move into normal position after the turn has been passed.

A still further object is to provide side lights, one of which will remain stationary while the other will turn with the steering-wheels, thereby directing the lights in two directions while the machine is rounding a curve.

With the above and other objects in view the invention consists of rotatable shafts mounted upon the sides of an automobile, and each supporting a lamp, which is held normally projected forward by springs provided for that purpose. Another shaft is arranged at the center of the front of the machine and carries a headlight. All of the shafts have forwardly-projecting fingers, which engage projections on a rod disposed parallel with the front axle and connecting-arms which move with the steering-wheels. The parts are so arranged that when the wheels turn in one direction the headlight and one of the side lights will move therewith and when the wheels are turned in the opposite direction the other side light and the headlight will be actuated. The headlight is adapted to be thrown out of operative relation with the wheels.

The invention also consists of certain other novel features of construction and combinations of parts which will be hereinafter more fully described, and pointed out in the claims.

In the accompanying drawings is shown the preferred form of the invention.

In said drawings, Figure 1 is a front elevation of a portion of an automobile having the improvements applied thereto. Fig. 2 is a plan view of the parts shown in Fig. 1, and showing in full and dotted lines two positions which may be assumed by the parts. Fig. 3 is a detail view of the headlight-support and the means for connecting it to its actuating mechanism, the finger of said support being shown by dotted lines out of operative position. Fig. 4 is a detail view of the support of one of the side lamps, the relative position of the actuating-rods being disclosed; and Fig. 5 is a detail view of the lower portion of the headlight-support.

Referring to the figures by characters of reference, 1 is the body of an automobile having side brackets 2, the upper ones of which are formed with stop-lugs 3. Rotatably mounted in these brackets are vertical shafts 4, each having a head 5 at its upper end from which extends a lug 6. These lugs are held normally in contact with the lugs 3 by means of springs 7, which surround the shafts and are secured thereto and to the upper heads. Side lamps 8 are fastened upon the heads 5, and arms 9 extend forward from the lower ends of the shafts.

A plate 10 is secured to the front of the body and carries a sleeve 11, in which is rotatably mounted a shaft 12, having a headlight 13 disposed above its upper end. The lower end of the shaft has an angular extension 14, on which is normally seated the enlarged end 15 of a slotted arm 16. A hooked hanger 17 is disposed adjacent the shaft 12, and by lifting arm 16 off of the extension 14 it can be turned into engagement with the hanger and supported thereby out of operative position.

The wheels 18 are connected to the fixed axle 19 in any preferred manner, and forwardly-extending arms 20 swing with the wheels and are connected by a cross-rod 21, which is pivoted to the arms and is parallel with the axle. Fingers 22 extend upward from this rod between and in contact with the arms 9, and a shank 23 is adjustably mounted within the rod and extends forward therefrom. This shank is adapted to be fastened by a set-screw 24, and has a finger 25 extending upward from it and adapted to engage the slotted arm 16 while the same is seated on the extension 14.

When the parts are all connected in the manner described, it will be seen that when the wheels are turned in one direction one of the fingers 22 will swing the adjoining arm 9 laterally, thereby tensioning the spring 7 on the shaft 4 of said arms and causing the side light to swing in the direction in which the machine is turning. The other side lamp, however, will continue to throw the light forward from the machine. When the wheels are returned to their original positions in relation to the body, the tensioned spring 7 will return the side lamp to its normal position. If the slotted arm 16 is in engagement with finger 25, the headlight 13 will be caused to turn with the wheel; but by detaching the arm 16 from the finger and placing it in engagement with hanger 17 the headlight can be secured so as to point straight ahead under all conditions.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the invention.

What is claimed is—

1. The combination with a vehicle-body having supporting-wheels pivotally mounted thereunder; of side lamps carried by the body, means for holding said lamps normally directed forward from the body, and means operated by the pivotal movement of the wheels for turning the lamps independently one at a time in the direction of travel of the vehicle when turning.

2. The combination with a vehicle-body and supporting-wheels pivotally mounted thereunder; of side shafts rotatably mounted on the body, lamps carried thereby, means for holding the lamps and shafts normally in predetermined positions, and means operated by the pivotal movement of the wheels for turning the shafts independently one at a time to point a lamp in the direction of travel of the vehicle when turning.

3. The combination with a vehicle-body and supporting-wheels pivotally mounted thereunder; of side shafts rotatably mounted on the body, lamps carried thereby, means for holding the lamps and shafts normally in predetermined positions, fingers interposed between the shafts, and movable laterally with the wheels, and means operated by the fingers for turning the shafts independently one at a time to point a lamp in the direction of travel of the vehicle when turning.

4. The combination with a vehicle-body and supporting-wheels pivotally mounted thereunder; of side shafts carried by the body, arms extending therefrom, lamps carried by the shafts, means upon the shafts for normally holding the lamps directed forward, a laterally-movable rod actuated by the pivotal movement of the wheels, and fingers upon the rod and between the arms for swinging the arms and turning the shafts independently one at a time to point a lamp in the direction of travel of the vehicle when turning.

5. The combination with a vehicle-body and supporting-wheels pivotally mounted thereunder; of a shaft carried by the body, a lamp upon the shaft, a slotted arm normally engaging and movable with the shaft, a laterally-movable rod actuated by the pivotal movement of the wheels, means upon the rod for engaging the arm to swing it, and means carried by the body for supporting the arm out of operative position.

In testimony that I claim the foregoing as my own I have hereto affixed my signature in the presence of two witnesses.

CASSIUS M. SPINK.

Witnesses:
GEO. A. ROBERTS,
JOHN I. WILLIAMS.